United States Patent
Zwerg et al.

(10) Patent No.: US 12,158,804 B1
(45) Date of Patent: Dec. 3, 2024

(54) DEVICE TRIMMING VIA DIRECT MEMORY ACCESS

(71) Applicant: TEXAS INSTRUMENTS INCORPORATED, Dallas, TX (US)

(72) Inventors: Michael Zwerg, Dallas, TX (US); Gregory North, Austin, TX (US); Ashwini Gopinath, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/345,449

(22) Filed: Jun. 30, 2023

Related U.S. Application Data (60) Provisional application No. 63/466,369, filed on May 15, 2023.

(51) Int. Cl.
  *G06F 11/10* (2006.01)
  *G06F 12/02* (2006.01)
  *G06F 13/28* (2006.01)

(52) U.S. Cl.
  CPC ...... *G06F 11/1004* (2013.01); *G06F 12/0253* (2013.01); *G06F 13/28* (2013.01)

(58) Field of Classification Search
  CPC ... G06F 11/1004; G06F 12/0253; G06F 13/28
  See application file for complete search history.

(56) References Cited

U.S. PATENT DOCUMENTS

| | | | | |
|---|---|---|---|---|
| 6,260,104 | B1* | 7/2001 | Roohparvar | G11C 16/20 365/185.01 |
| 11,514,990 | B1* | 11/2022 | Kumar | G11C 5/147 |
| 2013/0007348 | A1* | 1/2013 | Fai | G06F 9/4401 711/E12.008 |
| 2015/0221635 | A1* | 8/2015 | Klingstrom | H01L 27/06 327/564 |
| 2020/0050581 | A1* | 2/2020 | Pinilla Pico | G06F 15/7867 |
| 2020/0082887 | A1* | 3/2020 | Cadloni | G06F 12/0253 |
| 2023/0138906 | A1* | 5/2023 | Hoel | G06F 21/575 726/26 |

OTHER PUBLICATIONS

C. Munch, J. Yun, M. Keim and M. B. Tahoori, "MBIST-based Trim-Search Test Time Reduction for STT-MRAM," 2022 IEEE 40th VLSI Test Symposium (VTS), San Diego, CA, USA, 2022, pp. 1-7, (Year: 2022).*

* cited by examiner

*Primary Examiner* — Daniel F. McMahon
(74) *Attorney, Agent, or Firm* — Brian D. Graham; Frank D. Cimino (57) ABSTRACT

Various examples disclosed herein relate to trimming of system elements to prepare the elements for execution of boot code and application code. In an example embodiment, a system is provided. The system includes system control circuitry, direct memory access (DMA) circuitry, and processing circuitry. The system control circuitry is configured to instruct the DMA circuitry to obtain trim data from memory upon detecting that a first group of system elements has reached an initialized state. The DMA circuitry obtains the trim data and writes it to trim registers. The system control circuitry supplies the trim data to a second group of system elements to bring them to an operational level, then instructs the processing circuitry to execute boot code.

20 Claims, 6 Drawing Sheets

DEVICE TRIMMING VIA DIRECT MEMORY ACCESS

CROSS-REFERENCE TO RELATED APPLICATIONS

This application claims priority to and the benefit of U.S. Provisional Patent Application No. 63/466,369, filed May 15, 2023, which is incorporated by reference herein in its entirety.

TECHNICAL FIELD

This relates generally to trimming of system elements during start-up sequences of a processing system.

BACKGROUND

Processing devices such as microcontroller units (MCUs) are designed to run software programs and perform functions enabled by running the software programs. To do so, MCUs have processing nodes configured to execute software and memory coupled with the processing cores that stores the instructions and data of the software. For example, MCUs can have one or more central processing units (CPUs) that communicate with random access memory (RAM) to execute such software programs. MCUs also have on-chip voltage regulators and oscillators to ensure hardware devices onboard the MCUs function as intended when executing software programs. Prior to executing software programs, however, device-specific trimming may be performed to ensure correct functionality of these regulators and oscillators. Device trimming may refer to providing devices (e.g., an oscillator) on a system-on-chip ("SoC") with specific parameters (e.g., timing parameters) to function properly so the CPU can execute the software programs.

In an example, device trimming can be performed by one-time programmable (OTP) fuse cells or laser fusing. For example, poly-fuses can be included on a chip. The poly-fuses can change states based on electric current flowing through a poly bridge. Similarly, laser fusing can be performed to cut a metal bridge with a laser beam during production of a chip. Both of these trimming solutions may entail large physical structures on silicon chips, though, which means many of these solutions are expensive and can only be performed once. Given such solutions' one-time usage, these solutions also have inherent limitations with respect to testability.

In another example, the CPU of an MCU can perform device trimming during boot time. In such examples, the CPU can first begin a boot sequence by executing boot code from ROM. During the boot sequence, the CPU can provide trim data to devices on the chip. Because the devices are not trimmed at the start of the boot sequence, the SoC cannot run at full-speed yet. Therefore, the boot sequence may run at a reduced speed relative to device trimming outside of the boot sequence, which may delay the execution of the software programs. Further, it takes processing capacity for the CPU to transfer the trim data to devices, so processing capacity utilization may also be inefficient in such examples.

Another tradition method of device trimming includes using hardware on the SoC dedicated to performing the trimming. The dedicated hardware can be triggered to provide trim data to devices on the SoC. However, the hardware is only used during this trimming sequence. Thus, this solution adds both cost and physical components to the design of a SoC.

SUMMARY

Disclosed herein are improvements to trimming sequences for initializing and preparing system elements for the execution of boot code and application code. In an example embodiment, a system is provided. The system includes system control circuitry, direct memory access (DMA) circuitry, and processing circuitry. The system control circuitry is configured to detect that a state of a first group of system elements satisfies a threshold state and instruct, in response to detecting that the state of the first group of system elements satisfies the threshold state, the direct memory access circuitry to obtain trim data from memory. The DMA circuitry is configured to obtain the trim data and write the trim data to trim registers of the system control circuitry. The system control circuitry is further configured to supply the trim data to a second group of system elements to bring a state of the second group of system elements to an operational level and instruct, after supplying the trim data to the second group of system elements, the processing circuitry to execute the boot code. The processing circuitry is configured to execute the boot code in response to the instruction from the system control circuitry.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some examples, components or operations may be separated into different blocks or may be combined into a single block.

DETAILED DESCRIPTION

Discussed herein are enhanced components, techniques, and systems related to device trimming of components of a processor. A processor can be tasked with executing software (e.g., application code) to enable functionality of an application, device, or system. To execute software, the processor may include various components, such as one or more processing cores (e.g., a central processing unit (CPU)) capable of accessing the software from memory and executing instructions and data. However, prior to executing software, several hardware components may need to be trimmed to ensure proper functionality when the processor executes the software. Trimming may refer to providing devices (e.g., an oscillator) on a system-on-chip ("SoC") with specific parameters (e.g., timing parameters) to function properly and correct for variability in the operation of the devices. Traditional solutions related to device trimming include adding physical components to a SoC, such as poly-fuses or dedicated trim circuitry, which can increase the cost and size of the SoC. Another traditional solution for device trimming includes the CPU of a SoC performing trimming during boot, however, this solution can reduce processing efficiency while also increasing the time it takes to perform a boot sequence and the delay before being able to execute software.

Instead, as disclosed herein, device trimming may be performed by a direct memory access (DMA) controller prior to a boot sequence, which may not only decrease latency in the execution of boot or application code but also decrease cost in the design of an SoC by utilizing existing system architecture (e.g., the DMA controller). The DMA controller may be configured to perform device trimming based on a trigger from system control circuitry of a SoC. The DMA controller can obtain trim data from memory and provide the trim data to various elements of the SoC to prepare the elements for an execution of boot code and application code. Advantageously, such a design can reuse existing SoC infrastructure and additionally include sequencing enhancements to perform initialization of the system elements, trimming of the system elements, boot, and application code execution in a timely and efficient manner.

In an example embodiment, a system is provided. The system includes system control circuitry, direct memory access (DMA) circuitry, and processing circuitry. The system control circuitry is configured to detect that a state of a first group of system elements satisfies a threshold state and instruct, in response to detecting that the state of the first group of system elements satisfies the threshold state, the direct memory access circuitry to obtain trim data from memory. The DMA circuitry is configured to obtain the trim data and write the trim data to trim registers of the system control circuitry. The system control circuitry is further configured to supply the trim data to a second group of system elements to bring a state of the second group of system elements to an operational level and instruct, after supplying the trim data to the second group of system elements, the processing circuitry to execute the boot code. The processing circuitry is configured to execute the boot code in response to the instruction from the system control circuitry.

In another example, a system controller is provided. The system controller includes detection circuitry and control circuitry coupled to the detection circuitry. The detection circuitry is configured to detect that a state of a first group of system elements satisfies a threshold state and instruct, in response to detecting that the state of the first group of system elements satisfies the threshold state, the control circuitry to obtain trim data from memory. The control circuitry is configured to obtain the trim data and write the trim data to trim registers, supply the trim data to a second group of system elements to bring a state of the second group of system elements to an operational level, and instruct, after supplying the trim data to the second group of system elements, processing circuitry to execute the boot code.

In yet another embodiment, a method is provided. The method includes identifying output values of a first group of system elements (e.g., power management circuitry and timing circuitry) ahead of loading and executing boot code, instructing a direct memory access controller to obtain trim data from memory based on the output values, obtaining the trim data from one or more trim registers written to by the direct memory access controller in response to the instruction, supplying the trim data to a second group of system elements, and executing the boot code after supplying the trim data to the second group of system elements.

Figure 1:
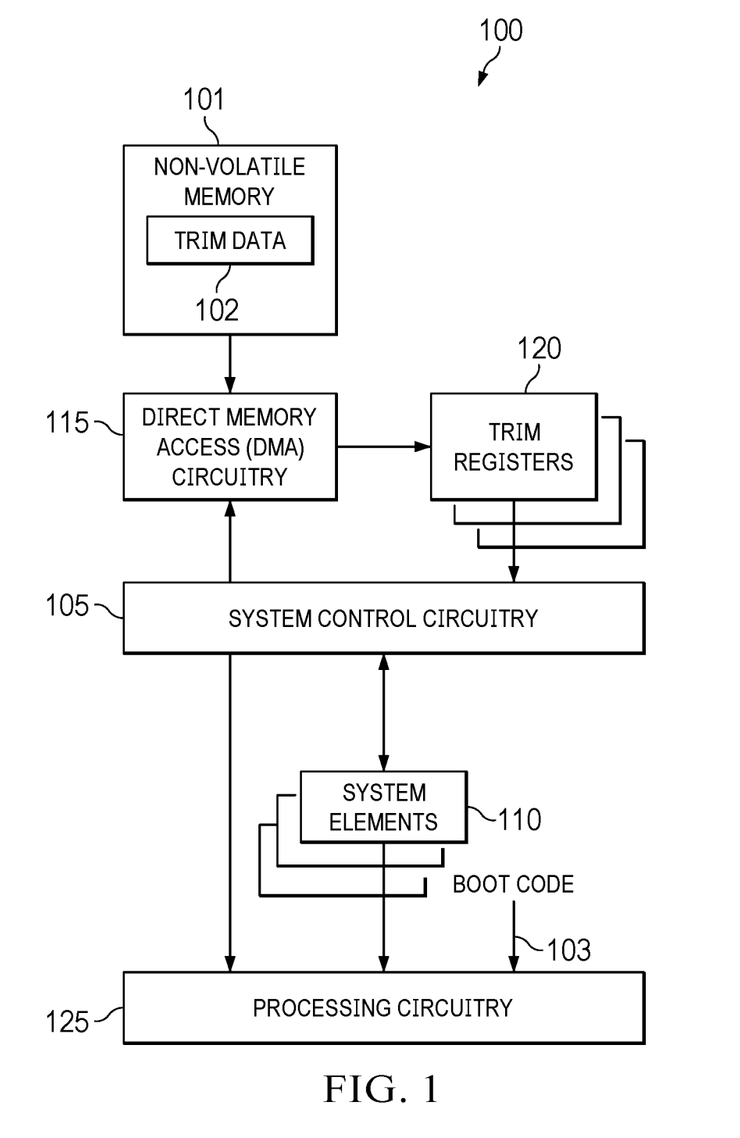
FIG. 1 illustrates an example system configurable to perform trimming sequences in an implementation.

FIG. 1 illustrates an example system configurable to perform device trimming in an implementation. FIG. 1 shows system 100, which includes non-volatile memory 101, system control circuitry 105, system elements 110, direct memory access (DMA) circuitry 115, trim registers 120, and processing circuitry 125. System control circuitry 105, DMA circuitry 115, and processing circuitry 125 can be configured to operate trimming sequences, such as process 200 of FIG. 2, to prepare system elements 110 to be used in executing boot code 103.

System 100 may be representative of a system-on-chip (SoC) including various hardware elements configured to execute software and firmware to enable functionality based on the execution thereof. System control circuitry 105 is included in system 100 and may represent state machine circuitry capable of controlling initialization, trim, boot, and execution sequences performable by system 100. In controlling such sequences, system control circuitry 105 may be configured to instruct or control other elements of system 100 in an ordered manner according to a set of sequential steps and based on states of the other elements.

At a first time, system control circuitry 105 may control a hardware initialization sequence that includes the start-up of system elements 110. System elements 110 are representative of various hardware elements of system 100 that provide power and timing synchronization to other elements of system 100. For example, system elements 100 may include one or more voltage regulators (e.g., bandgap reference circuitry) and timing circuitry (e.g., an oscillator). System elements 110 may be coupled to an external power supply (not shown) that can supply an input voltage to one or more of system elements 110, and system elements 110 can output values (e.g., a voltage, a clock signal at varying frequencies) when powered by the input voltage. The state of system elements 110 may be determined based on the output values produced by system elements 110.

During a hardware initialization sequence initiated by system control circuitry 105, system elements 110 may operate in a first state for a period of time in which system elements 110 output initial values to power-up and synchronize components of system 100. For example, as the input voltage from the power supply stabilizes, the voltage regulators can produce a near-constant reference voltage. After the voltage regulators produce a reference voltage satisfying a threshold voltage, system control circuitry 105 can direct timing circuitry to produce a clock signal at a first frequency. The first frequency of the clock signal may be less than an operational frequency (i.e., the frequency at which the timing circuitry may produce the clock signal during execution of boot code or application code) and can be selected based on desired performance of system 100 and tolerances of the system 100 to clock inaccuracies.

After the timing circuitry produces the clock signal at a frequency satisfying a threshold frequency, system control circuitry 105 can start up non-volatile memory 101. In various examples, system control circuitry 105 can direct non-volatile memory 101 to operate in a two transistor two capacitor (2T2C) configuration to allow data to be read from non-volatile memory 101 before trimming is applied to non-volatile memory 101. System control circuitry 105 can wait a pre-determined amount of time (e.g., 3 microseconds) for non-volatile memory 101 to be available for access before beginning a trim sequence.

If, at any point during the hardware initialization sequence, the output values produced by system elements 110 do not satisfy the respective threshold values, system control circuitry 105 may attempt to repeat the hardware initialization sequence from the beginning to reset system elements 110. In various examples, the threshold values may be pre-determined, pre-configured values based on system 100 and components thereof.

Once the state of system elements 110 satisfies a threshold state, or in other words, the output values satisfy the respective threshold values, system control circuitry 105 can control a trim sequence. System control circuitry 105 can begin the trim sequence by instructing DMA circuitry 115 to obtain trim data 102 from non-volatile memory 101 and write trim data 102 to trim registers 120.

DMA circuitry 115 is representative of hardware capable of accessing memory (e.g., trim registers 120, non-volatile memory 101) independent of processing circuitry 125 (e.g., a CPU). DMA circuitry 115 can be configured with memory addresses (e.g., source addresses, destination addresses) and with reading and writing operations to read from and write to memory. For example, DMA circuitry 115 may be able to operate in one or more addressing modes, such as fixed address to fixed address, fixed address to a block of addresses, block of addresses to fixed address, block of addresses to another block of addresses, fill data to block of addresses, and/or data table to a specific address, and in one or more transfer modes, such as single transfer, block transfer, repeated single transfer, and/or repeated block transfer.

In this example embodiment, system control circuitry 105 can provide a first trigger to DMA circuitry 115 for DMA circuitry 115 to load the source address corresponding to trim data 102, the destination address corresponding to addresses of trim registers 120, and the size and mode of the transfer to be used during the trim sequence. More specifically, system control circuitry 105 can direct DMA circuitry 115 to operate in a block transfer mode. In response to the trigger, DMA circuitry 115 can read trim data 102 from the non-volatile memory and write trim data 102 to trim registers 120.

Trim registers 120 are representative of memory registers accessible by system control circuitry 105 and DMA circuitry 115, among other elements of system 100. In some examples, trim registers 120 may be coupled to system control circuitry 105.

After DMA circuitry 115 transfers trim data 102 to trim registers 120, system control circuitry 105 can provide trim data 102, or portions thereof, to system elements 110. System control circuitry 105 may provide trim data 102 to the same elements involved in the initialization sequence, however, system control circuitry 105 may provide trim data 102 to fewer, additional, or different elements than those elements involved in the initialization sequence. System elements 110 can use trim data 102 to update parameters with which to operate. For example, system control circuitry 105 may provide trim data 102 to random access memory (RAM). In this example, trim data 102 may include corrective information (e.g., row replacement) related to the RAM's repair mechanism. By way of another example, system control circuitry 105 may provide trim data 102 to an oscillator. Trim data 102 may include parameters at which the oscillator is to use for future sequences and operations.

Next, system control circuitry 105 can control a boot sequence after system elements 110 are trimmed via trim data 102. The boot sequence includes providing the clock signal and a reset signal from system elements 110 to processing circuitry 125. Processing circuitry 125 is representative of one or more processor cores capable of executing software and firmware, such as boot code 103 and application code. Such processor cores(s) may include cores of microcontrollers, DSPs, general purpose central processing units, application specific processors or circuits (e.g., ASICs), and logic devices (e.g., FPGAs), as well as any other type of processing device, combinations, or variations thereof. With the clock signal and reset released to processing circuitry 125, processing circuitry 125 can fetch boot code 103 from read-only memory (ROM) to begin executing firmware instructions. Because trimming of system elements 110 is complete before the boot sequence, processing circuitry 125 can execute boot code 103 at a faster rate relative to methods where trimming occurs during the boot sequence.

Following the boot sequence, system control circuitry 105 can direct processing circuitry 125 to execute application code to enable functionality of the application code. In various examples, system control circuitry 105 can fetch and execute the application code from non-volatile memory 101 (e.g., flash) and/or volatile memory (not shown) (e.g., RAM, dynamic RAM (DRAM), static RAM (SRAM), double data rate (DDR)). In various examples, the memory discussed herein (non-volatile memory and volatile memory) may be external or internal to system 100.

Figure 2:
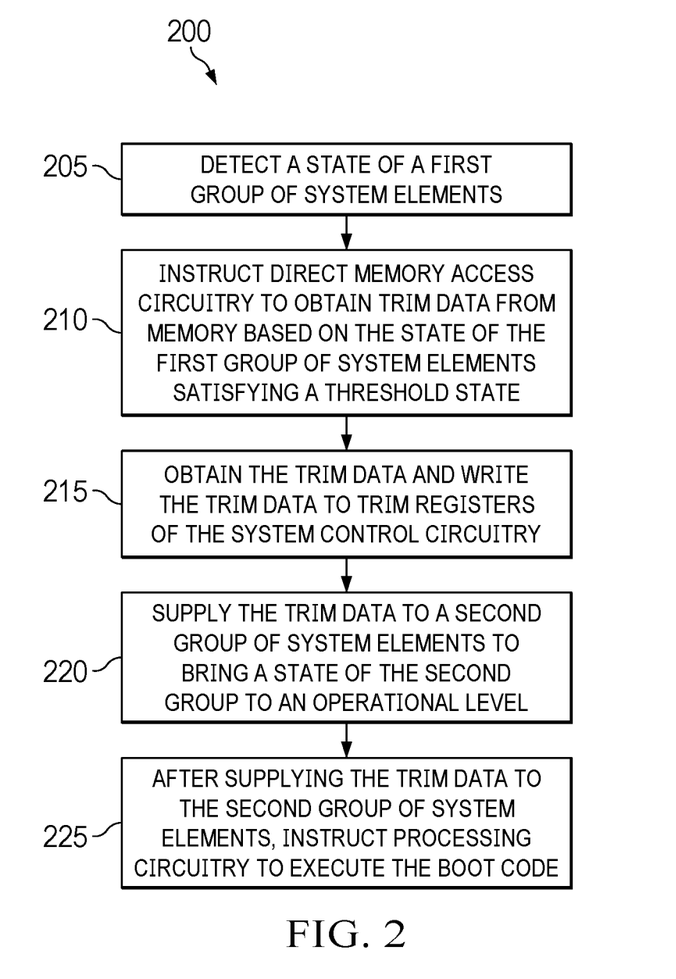
FIG. 2 illustrates a series of steps for trimming system elements prior to executing boot code in an implementation.

FIG. 2 illustrates a series of steps for trimming system elements prior to executing boot code in an implementation. FIG. 2 includes process 200 described below, which references elements of FIG. 1. Process 200 can be implemented on software, firmware, and/or hardware, or any combination or variation thereof. For example, one or more components of a processing system, such as system 100 of FIG. 1, can perform process 200.

In operation 205, system control circuitry 105 detects a state of a first group of system elements 110. In some examples, system control circuitry 105 represents state machine circuitry capable of controlling initialization, trim, boot, and execution sequences performable by system 100 based on states of system elements 110. In controlling such sequences, system control circuitry 105 may be configured to instruct or control elements of system 100 according to sequential steps.

System elements 110 are representative of various hardware elements of system 100 that provide power and timing synchronization to other elements of system 100. For example, system elements 100 may include one or more voltage regulators, timing circuitry, and other power management circuitry. System elements 110, or a subset thereof, may be coupled to an external power supply that can supply an input voltage to one or more of system elements 110, and system elements 110 can output values when powered by the input voltage.

During an initialization sequence, system control circuitry 105 can direct a first group of system elements 110, such as one or more reference circuits and a timing circuit, to begin operating at a first state for a period of time in which the first group of system elements 110 outputs initial values to power-up and synchronize components of system 100. The state of system elements 110 may be determined based on the output values produced by system elements 110. For example, the state of the timing circuit may be "off" if the timing circuit is not outputting a clock signal. Various other individual states may be contemplated with respect to system elements 110. Collectively, the state of the first group of system elements 110 may be determined by identifying all of the output values of the elements in the first group of system elements 110. Accordingly, system control circuitry 105 can detect the state of the first group of elements by identifying values output by each of the elements.

In operation 210, system control circuitry 105 instructs DMA circuitry 115 to obtain trim data 102 from memory (e.g., non-volatile memory 101) based on the state of the first group of system elements 110 satisfying a threshold state. In various examples, the threshold state may be determined based on threshold values corresponding to output values of the elements. The threshold values may be pre-determined, pre-configured values based on system 100 and components thereof. Once the state of the first group of system elements 110 satisfies a threshold state, or in other words, the output values satisfy the respective threshold values, system control circuitry 105 can instruct DMA circuitry 115 to obtain trim data 102 from non-volatile memory 101 and write trim data 102 to trim registers 120.

DMA circuitry 115 is representative of hardware capable of accessing memory (e.g., trim registers 120, non-volatile memory 101) independent of processing circuitry 125 (e.g., a CPU). DMA circuitry 115 can be configured with memory addresses (e.g., source addresses, destination addresses) and with reading and writing operations to read from and write to memory. For example, DMA circuitry 115 may be able to operate in one or more addressing modes to perform functionality described herein.

In this example embodiment, system control circuitry 105 can provide a first trigger to DMA circuitry 115 for DMA circuitry 115 to load the source address corresponding to trim data 102, the destination address corresponding to addresses of trim registers 120, and the size and mode of the transfer to be used during the trim sequence.

In operation 215, in response to the trigger from system control circuitry 105, DMA circuitry 115 can obtain trim data 102 by reading trim data 102 from non-volatile memory 101 and write trim data 102 to trim registers 120. Trim registers 120 are representative of memory registers accessible by system control circuitry 105 and DMA circuitry 115, among other elements of system 100. In some examples, trim registers 120 may be coupled to system control circuitry 105.

In operation 220, after DMA circuitry 115 transfers trim data 102 to trim registers 120, system control circuitry 105 can supply trim data 102, or portions thereof, to a second group of system elements 110 to bring the second group to an operational level. The second group of system elements 110 may include the same elements as the first group, however, the second group may include fewer, additional, or different elements than the first group. For example, the second group of system elements 110 may include the timing circuitry, the power management circuitry, and random access memory (RAM) (e.g., SRAM). The operational level may refer to a level of operation where output values of the second group of system elements 110 satisfy threshold operational values sufficient for processing circuitry 125 to execute boot code 103 and application code.

Lastly, in operation 225, after supplying trim data 102 to the second group of system elements 110, system control circuitry 105 instructs processing circuitry 125 to obtain and execute boot code 103. Processing circuitry 125 is representative of one or more processors capable of executing software and firmware, such as boot code 103 and application code. With the second group of system elements 110 operating at the operational level, processing circuitry 125 can fetch boot code 103 from read-only memory (ROM) to begin executing firmware instructions. Because trimming of system elements 110 is complete before the boot sequence, processing circuitry 125 can execute boot code 103 at a faster rate relative to methods where trimming occurs during the boot sequence.

Figure 3:
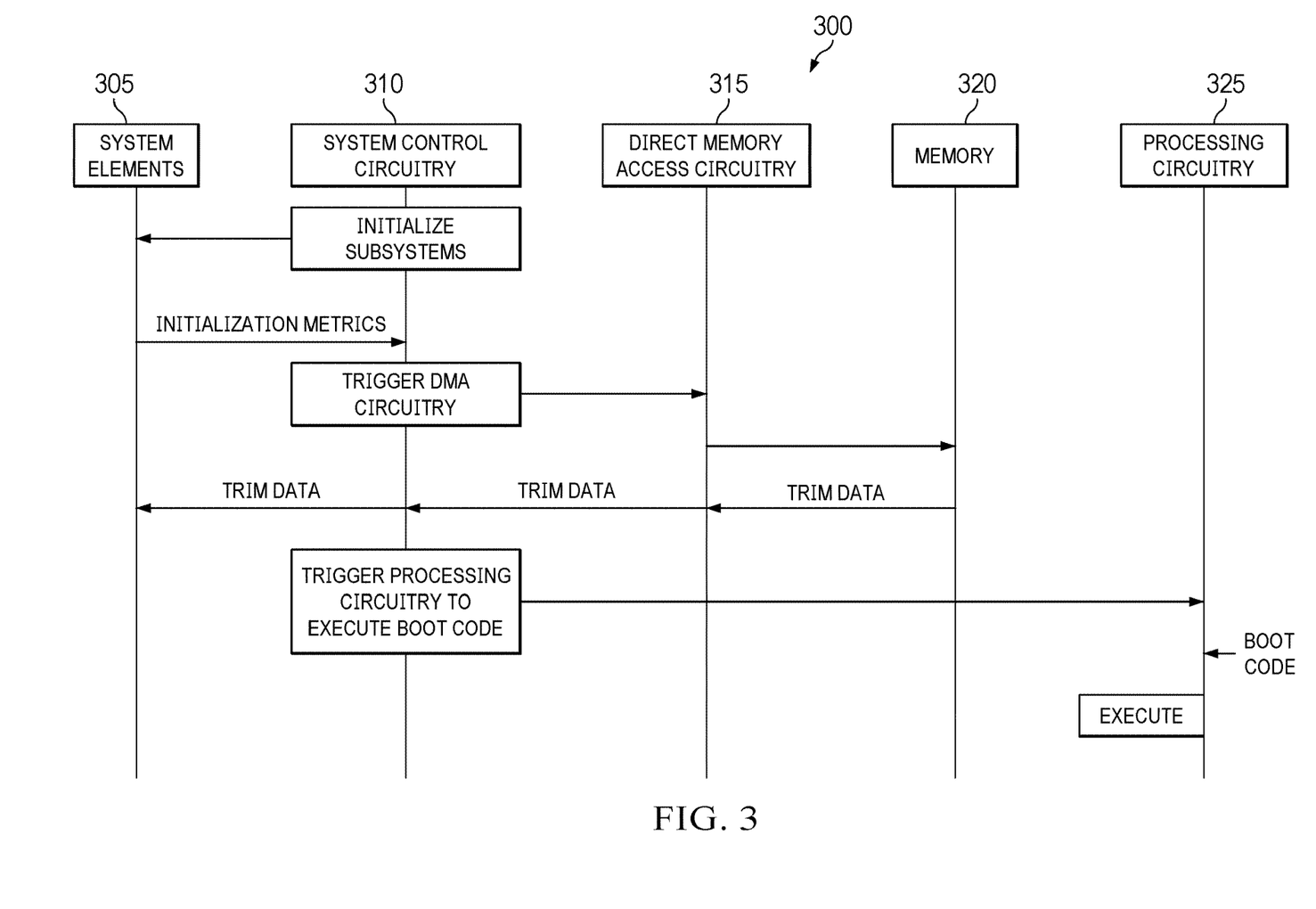
FIG. 3 illustrates an example sequence diagram demonstrating data flow between elements of a system in accordance with an implementation.

FIG. 3 illustrates an example sequence diagram demonstrating data flow between elements of a system in accordance with an implementation. FIG. 3 includes operating environment 300, which includes system elements 305, system control circuitry 310, direct memory access (DMA) circuitry 315, memory 320, and processing circuitry 325. The components of operating environment 300 may be representative of components of a processing system capable of performing trimming sequences, such as components of system 100 of FIG. 1.

In operation, system control circuitry 310 begins by initializing one or more groups or subsystems of system elements 305. The group of system elements 305 may include timing circuitry and/or power management circuitry, among other devices. Initializing the group of system elements 305 includes providing power, or an input voltage, to one or more of system elements 305. A power source may be coupled to provide the input voltage to one or more of system elements 305. As the input voltage stabilizes and the group of system elements 305 starts up, the group of system elements 305 can provide initialization metrics to system control circuitry 310. The initialization metrics can include parameters, output values, and other information corresponding to individual ones of system elements 305. For example, a power management circuit (e.g., a bandgap reference circuit) may output a reference signal after receiving the input voltage, and timing circuitry may output a clock signal having a frequency. In this example, system control circuitry 310 can identify a value of the reference signal and the frequency of the clock signal and determine whether the values satisfy threshold values.

If system control circuitry 310 determines that the initialization metrics of the group of system elements 305 satisfy threshold values, system control circuitry 310 can provide a trigger to DMA circuitry 315. If, however, system control circuitry 310 determines that the initialization metrics do not satisfy the threshold values, system control circuitry 310 may attempt to repeat the initialization of the group of system elements 305 until the group of system elements 305 outputs values that satisfy the threshold values.

To trigger DMA circuitry 315, system control circuitry 310 may provide a signal to DMA circuitry 315 to cause DMA circuitry 315 to read trim data from memory 320. Memory 320 may be any non-volatile memory (e.g., flash memory) accessible by DMA circuitry 315. In various examples, DMA circuitry 315 may be pre-configured with information about the trim data and how to obtain the trim data, such as a mode of operation, a size of the data transfer, source address information, and destination address information, among other information. Accordingly, DMA circuitry 315 can obtain the trim data from memory 320 in response to the trigger from system control circuitry 310 and write the trim data to trim registers of system control circuitry 310.

After DMA circuitry 315 writes the trim data to the designated addresses in the trim registers, system control circuitry 310 reads the trim data from the trim registers and provides the trim data to a group of system elements 305.

This group of system elements 305 may be the same or a different group of system elements 305 that system control circuitry 310 initialized previously. The trim data may include various parameters associated with individual ones of system elements 305. For example, the trim data corresponding to timing circuitry may indicate an operational frequency at which to produce the clock signal. Accordingly, system elements 305 may use the trim data to reach an operational level, such that at the operational level, processing circuitry 325 can execute boot code and/or application code.

Following the trimming of system elements 305, system control circuitry 310 can trigger processing circuitry 325 to execute boot code. In response to the trigger, processing circuitry 325 can be configured to read and execute the boot code from read-only memory (ROM) to prepare for an execution of the application code.

Figure 4:
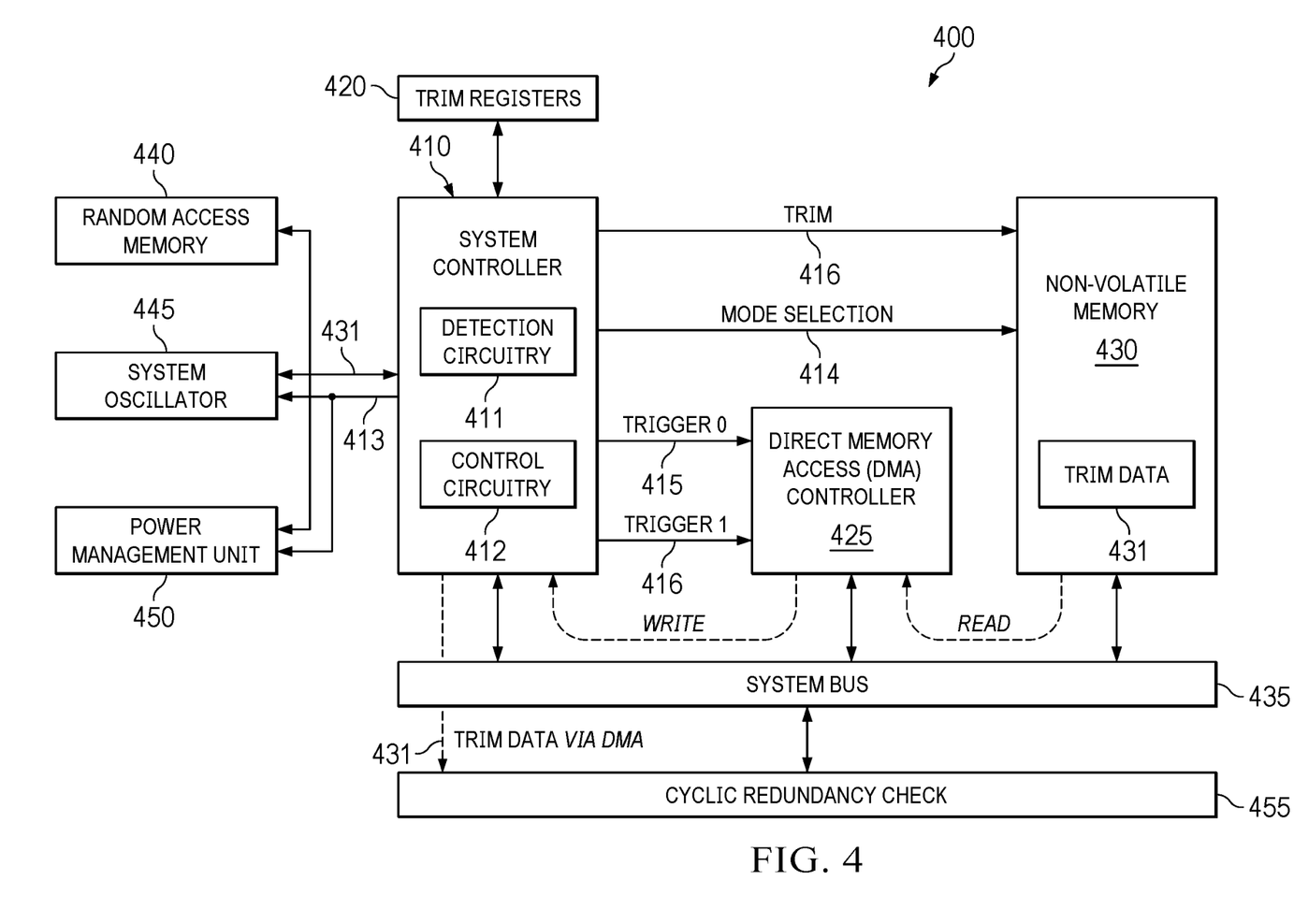
FIG. 4 illustrates an example system configurable to perform trimming sequences in an implementation.

FIG. 4 illustrates an example system configurable to perform trimming sequences in an implementation. FIG. 4 includes system 400, which includes system controller 410, trim registers 420, direct memory access (DMA) controller 425, non-volatile memory 430, system bus 435, random access memory (RAM) 440, system oscillator 445, power management unit (PMU) 450, and cyclic redundancy check (CRC) 455. System controller 410 and DMA controller 425 can be configured to perform trimming processes, such as process 200 of FIG. 2. System controller 410 may be an example implementation of system control circuitry 105 of FIG. 1, DMA controller 425 may be an example implementation of DMA circuitry 115, non-volatile memory 430 may be an example implementation of non-volatile memory 101, and RAM 440, system oscillator 445, and PMU 450 may be example implementations of system elements 110.

System 400 may be representative of a system-on-chip (SoC) including various hardware elements configured to execute software and firmware to enable functionality based on the execution thereof. System controller 410 is included in system 400 and may be implemented using a state machine capable of controlling initialization, trim, boot, and execution sequences performable by system 400. System controller 410 includes detection circuitry 411 and control circuitry 412, each of which may include one or more hardware components capable of detecting states of system elements (e.g., RAM 440, system oscillator 445, PMU 450) and controlling such system elements and other components of system 400, respectively. In controlling elements and sequences, system controller 410 may be configured to instruct or control other elements of system 400 in an ordered manner according to a set of sequential steps and based on states of the other elements.

System controller 410 may first control a hardware initialization sequence that includes the start-up of system oscillator 445 and PMU 450. System oscillator 445 represents an oscillator or timing circuit capable of generating a clock signal at varying frequencies. PMU 450 represents one or more voltage regulators and power circuits capable of generating reference signals for powering system oscillator 445 and other elements of system 400. An external power source (not shown) may be coupled to provide an input voltage to PMU 450. PMU 450 can output a reference voltage in response to receiving the input voltage. Detection circuitry 411 of system controller 410 may detect a value of the reference voltage to determine whether the reference voltage satisfies a threshold value.

In response to determining that the reference voltage satisfies the threshold value, system controller 410 can direct system oscillator 445 to generate a clock signal at a first frequency. The first frequency of the clock signal may be less than an operational frequency (i.e., the frequency at which system oscillator 445 may produce the clock signal during execution of boot code or application code) and can be selected based on desired performance of system 400.

After system oscillator 445 produces the clock signal at a frequency satisfying a threshold frequency, system controller 410 can provide mode selection 414 to non-volatile memory 430. In various examples, system controller 410 can direct the non-volatile memory 430 to operate in a two transistor two capacitor (2T2C) configuration using mode selection 414 to allow data to be read from the non-volatile memory 430 before trimming is applied to the non-volatile memory 430. System controller 410 can wait a pre-determined amount of time (e.g., 3 microseconds) for non-volatile memory 430 to be available for access before beginning a trim sequence.

If, at any point during the hardware initialization sequence, the output values produced by system oscillator 445 and/or PMU 450 do not satisfy respective threshold values, system controller 410 may attempt to repeat the hardware initialization sequence from the beginning to reset the elements. In various examples, the threshold values may be pre-determined, pre-configured values based on system 400 and components thereof. Once the state of system oscillator 445 and PMU 450 satisfy a threshold state, or in other words, the output values satisfy the respective threshold values, system controller 410 can control a trim sequence. System controller 410 can begin the trim sequence by providing trigger 0 415 to DMA controller 425.

DMA controller 425 is representative of hardware capable of accessing memory, such as non-volatile memory 430 independent of processing circuitry (e.g., a CPU) (not shown). DMA controller 425 may include various channels with which to access memory and perform reads and writes. In various examples, DMA controller 425 is configured with memory addresses (e.g., source addresses, destination addresses) and with reading and writing operations to read from and write to memory. For example, DMA controller 425 may be able to operate in one or more addressing modes, such as fixed address to fixed address, fixed address to a block of addresses, block of addresses to fixed address, block of addresses to another block of addresses, fill data to block of addresses, and/or data table to a specific address, and in one or more transfer modes, such as single transfer, block transfer, repeated single transfer, and/or repeated block transfer.

In this example embodiment, DMA circuitry 425 may load a source address corresponding to trim data 431 of non-volatile memory 430 in response to trigger 0 415 from system controller 410. DMA circuitry 425 may further load the destination address corresponding to one or more addresses of trim registers 420 and the size and operating mode to be used to transfer trim data 431 from non-volatile memory 430 to trim registers 420. DMA circuitry 425 can read trim data 431 via system bus 435 and write trim data 431 to trim registers 420 via system bus 435.

System bus 435 is representative of a communication system capable of transferring data (e.g., trim data 431) between components of system 400. System bus 435 may include various hardware elements that may be configured to execute software and/or firmware to transfer such data.

Trim registers 420 are representative of memory registers accessible by system controller 410 and DMA controller 425, among other elements of system 400, via system bus 435. In some examples, trim registers 420 may be coupled to system controller 410.

After DMA controller 425 transfers trim data 431 to trim registers 420, system controller 410 can provide trim data 431, or portions thereof, to RAM 440, system oscillator 445, and PMU 450. RAM 440, system oscillator 445, and PMU 450 can use trim data 431 to update parameters with which to operate. For example, trim data 431 provided to RAM 440 may include corrective information related to RAM 440's repair mechanism. By way of another example, trim data 431 provided to system oscillator 445 may include parameters at which system oscillator 445 is to use for future sequences and operations. In another example, trim data 431 provided to PMU 450 may include parameters at which PMU 450 is to use to correct for variances in operation.

Next, system controller 410 can provide trigger 1 416 to DMA controller 425 to perform a verification sequence after the elements are trimmed via trim data 431. In response to trigger 1 416, DMA controller 425 may load a source address of trim registers 420 corresponding to trim data 431, a destination address of CRC 455, and a size and operating mode to be used to transfer trim data 431 from trim registers 420 to CRC 455 via system bus 435. DMA controller 425 can read trim data 431 from trim registers 420 via system bus 435 and write trim data 431 to CRC 455 via system bus 435.

CRC 455 is representative of an error-detecting module capable of performing a check for errors when loading trim data 431. CRC 455 can perform a validation check using any combination of hardware, firmware, and/or software. In various examples, CRC 455 can perform a check on trim data 431 and on system oscillator 445 and PMU 450 to determine whether system oscillator 445 and PMU 450 are trimmed correctly with trim data 431. In other words, CRC 455 can determine whether system oscillator 445 and PMU 450 have loaded trim data 431 successfully, or without errors. If CRC 455 determines that system oscillator 445 and PMU 450 have not loaded trim data 431, CRC 455 can provide an indication thereof to system controller 410 to perform a power-on reset and a further attempt to provide trim data 431 to system oscillator 445 and PMU 450. If, after the reset and the further attempt, CRC 455 determines another error in loading trim data 431, CRC 455 can provide another indication to system controller 410 to perform another reset and attempt. However, in various cases, after three fails, system controller 410 may control system 400 to enter into a controlled shut-down mode. The number of failures before entering into the controlled shut-down mode may vary. If CRC 455 determines that system oscillator 445 and PMU 450 have loaded trim data 431 successfully, CRC 455 can provide an indication thereof to system controller 410, and system controller 410 can initiate a boot sequence in response to the indication. During the boot sequence, system controller 410 can load, via DMA controller 425 and system bus 435, boot code from read-only memory (not shown) to prepare system 400 for execution of application code.

Figure 5:
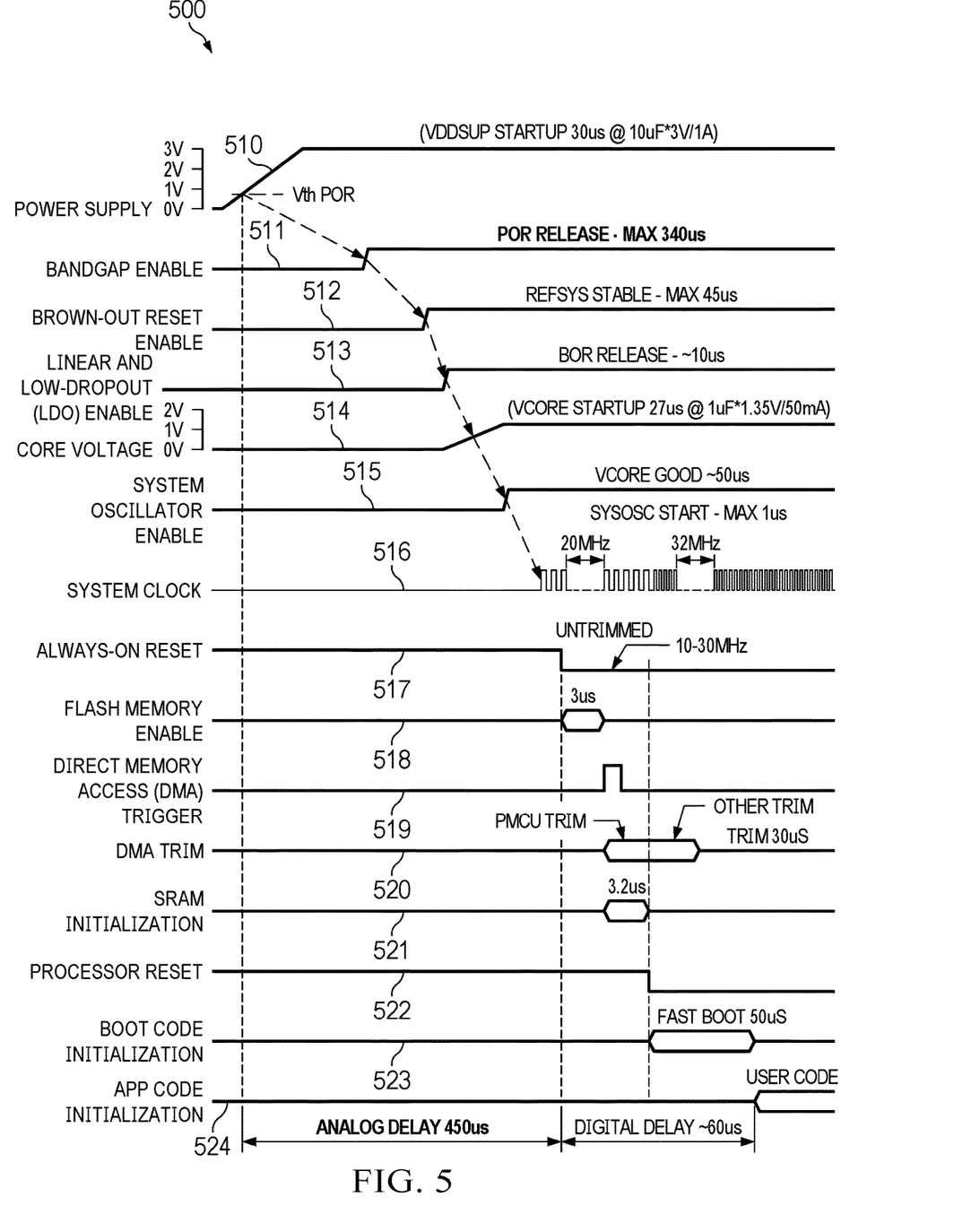
FIG. 5 illustrates an example timing diagram demonstrating a start-up sequence in accordance with an implementation.

FIG. 5 illustrates an example timing diagram demonstrating a start-up sequence in accordance with an implementation. FIG. 5 includes timing diagram 500, which includes example states and output values produced by components of a system (e.g., system 100 of FIG. 1) during initialization, boot, and code execution stages. States demonstrated by timing diagram 500 may include an illustration of a low signal (e.g., "0" or "off") or an illustration of a high signal (e.g., "1" or "on").

In various examples, system control circuitry, such as system control circuitry 105 of FIG. 1, can be coupled to and control components included in timing diagram 500. For example, system control circuitry can detect a state or the values output by the components and control further components based on the states or the values output by the components.

Power supply 510 is representative of an external power source that can provide an input voltage ($V_{DD}$) to the system, or components thereof. For example, power supply 510 may be coupled to provide the input voltage to bandgap enable 511. As illustrated, power supply 510 may produce a voltage between 0 V and 3V. When power supply 510 produces the input voltage at a value meeting or exceeding a threshold voltage (Vth) (e.g., 1 V), system control circuitry can provide a power-on reset signal to bandgap enable 511 to allow bandgap enable 511 to operate.

Bandgap enable 511 is representative of a reference signal produced by a bandgap reference circuit that can use the input voltage from power supply 510 and output a reference voltage at a near-constant value despite fluctuations in the input voltage. In response to the power-on reset release, bandgap enable 511 can turn "on" and produce the reference voltage at a value.

Brown-out reset enable 512 is representative of a reset signal produced by a protection circuit that is configured to detect if bandgap enable 511 or the input voltage of power supply 510 drops below a threshold value. When bandgap enable 511 reaches or exceeds a threshold value, brown-out reset enable 512 can turn "on" to indicate that the power from power supply 510 and the bandgap reference circuit is sufficient to proceed.

Next, linear and low-dropout (LDO) enable 513 is representative of a signal produced by a circuit that is configured to output a constant voltage based on the input voltage. In response to brown-out reset enable 512 being released, the LDO circuitry can turn LDO enable 513 "on" and provide the constant voltage at a value to an internal power supply.

Core voltage 514 is representative of the internal voltage ($V_{CORE}$) of an internal power supply of the system. In various examples, the internal power supply can produce core voltage 514 at a value between 0 V and 2 V. The internal power supply can be coupled to various components including the system oscillator. In response to LDO enable 513 turning "on" and reaching a threshold value, the internal power supply can produce core voltage 514 at a designated value (e.g., 1.35 V).

System oscillator enable 515 is representative of a signal indicative of whether the system oscillator is "on" or "off," or, producing system clock 516 or not. In response to receiving an indication that core voltage 514 is at or beyond a threshold value, the system oscillator can turn "on," which can produce system oscillator enable 515 in the "on" state. As the system oscillator turns on, there may be a delay between the time when system oscillator enable 515 turns "on" and the time when the system oscillator produces system clock 516 (e.g., 1 microsecond). At this time, the system oscillator can produce system clock 516 at a first frequency (e.g., 20 MHz).

In response to system clock 516, always-on reset 517 can change states from "on" to "off," which can trigger flash memory to be initiated. In various examples, flash memory enable 518 may take 3 microseconds, which indicates the amount of time it may take for flash memory to be available for access by components of the system. However, a different duration of time may occur.

After flash memory is initialized, the system control circuitry can provide DMA trigger 519. DMA trigger 519 is representative of a signal provided by the system control circuitry to DMA circuitry to direct the DMA circuitry to obtain trim data from the flash memory. This action, illustrated as DMA trim 520, may occur at a first time upon DMA trigger 519 turning "on." In response to DMA trigger 519, the DMA circuitry can obtain the trim data and provide it to trim registers accessible by the system control circuitry. The system control circuitry can then provide the trim data to various components of the system, such as static random access memory (SRAM), the system oscillator, and several power management circuits, such as one or more of the previously initiated circuits described above in reference to timing diagram 500. The trim data used at this first time to trim devices may be referred to as power management and clock unit (PMCU) trim data. Importantly, the PMCU trim data can cause such components to operate at an operational state. For example, following DMA trim 520, the system oscillator can produce system clock 516 at an increased frequency, such as 32 MHz.

After the system control circuitry provides the PMCU trim data to the various components, SRAM initialization 521 may occur, which is representative of a repair of SRAM (e.g., row replacement, memory size) of the system. In some cases, SRAM initialization 521 may occur in 3.2 microseconds, however, other durations are possible.

Next, the system control circuitry may identify that the various devices received the PMCU trim data, so the system control circuitry triggers processor reset 522. Processor reset 522 refers to a reset signal that the system control circuitry can provide to one or more processors (e.g., processing circuitry 125 of FIG. 1), which can cause the one or more processors to begin boot code initialization 523. At this time, the one or more processors can obtain boot code from read-only memory and execute the boot code. In various examples, this may take 50 microseconds, however, boot code initialization 523 may be based on the size of the boot code and the capacity of the one or more processors. Further, other trimming may occur, as illustrated by DMA trim 520, at this time. This trimming may include providing trim data to components other than the system oscillator and power management circuits.

Following boot code initialization 523, the system control circuitry can direct the one or more processors to begin application code initialization 524. At this time, the one or more processors can obtain user code or application code from memory, such as flash memory or SRAM, and execute the application code.

Figure 6:
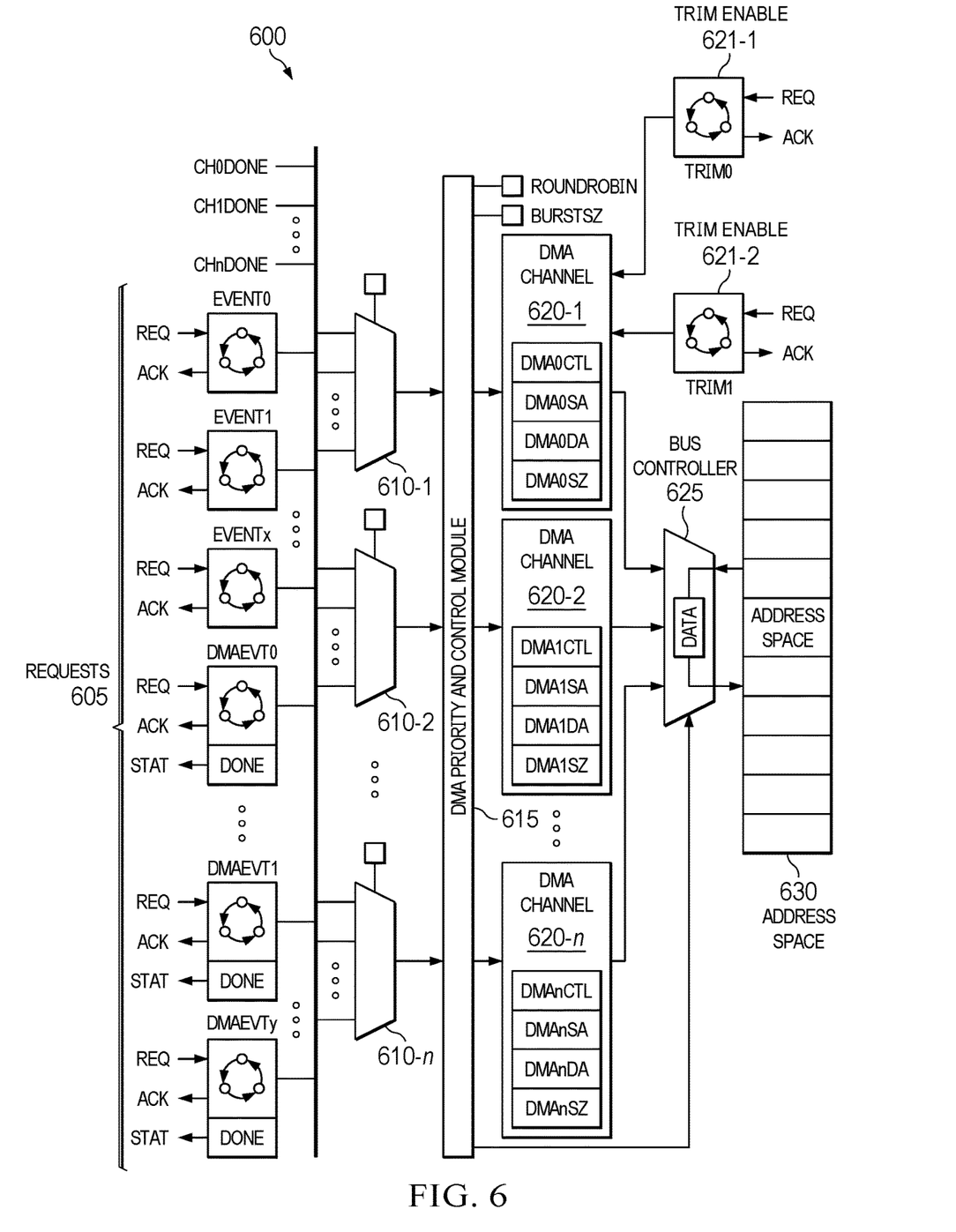
FIG. 6 illustrates an example block diagram of a direct memory access controller that may be used in an implementation.

FIG. 6 illustrates an example block diagram of a direct memory access (DMA) controller that may be used in an implementation such as in DMA circuitry 115 and/or DMA controller 425. FIG. 6 includes block diagram 600, which includes multiplexers 610, DMA priority and control module 615, DMA channels 620, trim enable 621, bus controller 625, and address space 630. Block diagram 600 may demonstrate elements of DMA circuitry or a DMA controller, such as DMA circuitry 115 of FIG. 1 or DMA controller 425 of FIG. 4.

Requests 605 include requests from system control circuitry, or another component of a processing system, corresponding to access to memory. For example, a first request, illustrated as "EVENT0" in block diagram 400, may be provided from system control circuitry to the DMA controller. The DMA controller may receive the request and provide an acknowledgement back to the system control circuitry. The request can then feed into one or more of multiplexers 610.

Multiplexers 610 include multiplexer 610-1, 610-2, and 610-n. Accordingly, any number of multiplexers 610 can be included in a DMA controller. Each of multiplexers 610 can be associated with one of DMA channels 620. For example, multiplexer 610-1 can provide requests to DMA channel 620-1. Multiplexers 610 can receive multiple of requests 605 and indicate a selection of DMA channels 620 to DMA priority and control module 615.

DMA priority and control module 615 is representative of circuitry capable of triaging requests 605 provided by multiplexers 610. The operation of DMA priority and control module 615 may be determined based on an operating or transfer mode. In some examples, the operating mode is may be pre-configured, however, in other examples, the operating mode may be selected by the system control circuitry. Based on the mode selected and the request provided by a respective one of multiplexers 610, DMA priority and control module 615 can provide information to one or more of DMA channels 620.

DMA channels 620-1, 620-2, and 620-n (collectively DMA channels 620) can each include control information, source addresses, and destination addresses, among other pre-configured information. The source addresses may refer to one or more addresses from where the DMA controller can read data. The destination addresses may refer to one or more addresses to where the DMA controller can write data. DMA channels 620 can receive a request for data from DMA priority and control module 615 and provide information (e.g., addresses) corresponding to the request to bus controller 625.

Bus controller 625 is representative of a communication system capable of transferring data to different locations in address space 630, from a location to address space 630, and/or to a location from address space 630. Address space 630 may be a set of memory addresses in a memory accessible by the DMA controller via bus controller 625.

In the example illustrated by block diagram 600, DMA channel 620-1 further includes trim enable 621-1 and 621-2. Trim enable 621-1 and 621-2 may be included so that the DMA controller can perform a hard-coded memory transfer without processor interaction from a fixed location in a memory (e.g., flash memory) to a fixed location in the system control circuitry and from the fixed location in the system control circuitry to a fixed location in a cyclic redundancy check (CRC) module, respectively.

By way of example, referring to elements of FIG. 4, trim enable 621-1 can be included so that DMA controller 425 can obtain trim data 431 from non-volatile memory 430 and write trim data 431 to trim registers 420 in response to receiving trigger 0 415 from system controller 410. Trim enable 621-1 provides DMA controller 425 with a source address corresponding to non-volatile memory 430, a destination address corresponding to trim registers 420, and a size and mode for the transfer. Additionally, DMA channel 620-1 includes trim enable 621-2, which may be included so that the DMA controller can obtain trim data 431 from trim registers 420, or from non-volatile memory 430, and write trim data 431 to CRC 455 in response to receiving trigger 1 416 from system controller 410. Like trim enable 621-1, trim enable 621-2 provides DMA controller 425 with a source address corresponding to trim registers 420, or non-volatile memory 430, a destination address corresponding to CRC 455, and a size and mode for the transfer.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some examples," "according to some examples," "in the examples shown," "in other examples," and the like generally mean the particular feature, structure, or characteristic following the phrase is included in at least one implementation of the present technology, and may be included in more than one implementation. In addition, such phrases do not necessarily refer to the same example or different examples.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system, comprising:
   system control circuitry;
   direct memory access circuitry; and
   processing circuitry;
   wherein the system control circuitry is configured to:
     detect that a state of a first group of system elements satisfies a threshold state; and
     instruct, in response to detecting that the state of the first group of system elements satisfies the threshold state, the direct memory access circuitry to obtain trim data from memory;
   wherein the direct memory access circuitry is configured to obtain the trim data and write the trim data to trim registers of the system control circuitry;
   wherein the system control circuitry is further configured to:
     supply the trim data to a second group of system elements to bring a state of the second group of system elements to an operational level; and
     instruct, after supplying the trim data to the second group of system elements, the processing circuitry to execute boot code; and
   wherein the processing circuitry is configured to execute the boot code in response to the instruction from the system control circuitry.

2. The system of claim 1, wherein the second group of elements comprises one or more of the system elements of the first group of system elements and one or more other system elements.

3. The system of claim 1, wherein the trim data includes initialization parameters for respective operations of the system elements of the second group of system elements.

4. The system of claim 3, wherein the system elements of the second group of system elements are configured to operate at the operational level according to the initialization parameters after being supplied the trim data.

5. The system of claim 1, wherein the processing circuitry is further configured to supply the trim data to cyclic redundancy checker circuitry.

6. The system of claim 5, wherein the cyclic redundancy checker circuitry is configured to perform a verification check on the trim data, and based on a successful verification check, provide a confirmation signal to the processing circuitry.

7. The system of claim 1, wherein the memory is external flash memory.

8. A system controller, comprising:
   detection circuitry; and control circuitry coupled to the detection circuitry;
wherein the detection circuitry is configured to:
- detect that a state of a first group of system elements satisfies a threshold state; and
- instruct, in response to detecting that the state of the first group of system elements satisfies the threshold state, the control circuitry to obtain trim data from memory; and wherein the control circuitry is configured to:
- obtain the trim data and write the trim data to trim registers;
- supply the trim data to a second group of system elements to bring a state of the second group of system elements to an operational level; and
- instruct, after supplying the trim data to the second group of system elements, processing circuitry to execute boot code.

9. The system controller of claim 8, wherein the second group of elements comprises one or more of the system elements of the first group of system elements and one or more other system elements.

10. The system controller of claim 8, wherein the trim data includes initialization parameters for respective operations of the system elements of the second group of system elements.

11. The system controller of claim 10, wherein the system elements of the second group of system elements are configured to operate at the operational level according to the initialization parameters after being supplied the trim data.

12. The system controller of claim 8, wherein the control circuitry is further configured to supply the trim data to cyclic redundancy checker circuitry.

13. The system controller of claim 12, further comprising the cyclic redundancy checker circuitry, and wherein the cyclic redundancy checker circuitry is configured to perform a verification check on the trim data, and based on a successful verification check, provide a confirmation signal to the processing circuitry.

14. The system controller of claim 8, wherein the memory is external flash memory.

15. A method, comprising:
- identifying output values of a first group of system elements ahead of loading and executing boot code, wherein the first group of system elements comprises power management circuitry and timing circuitry; and
- instructing a direct memory access controller to obtain trim data from memory based on the output values;
- obtaining the trim data from one or more trim registers written to by the direct memory access controller in response to the instruction;
- supplying the trim data to a second group of system elements; and
- executing the boot code after supplying the trim data to the second group of system elements.

16. The method of claim 15, wherein the second group of elements comprises one or more of the system elements of the first group of system elements and one or more other system elements.

17. The method of claim 15, wherein the trim data includes initialization parameters for respective operations of the system elements of the second group of system elements.

18. The method of claim 17, wherein the system elements of the second group of system elements are configured to operate according to the initialization parameters after being supplied the trim data.

19. The method of claim 15, further comprising supplying the trim data to cyclic redundancy checker circuitry.

20. The method of claim 19, wherein the cyclic redundancy checker circuitry is configured to perform a verification check on the trim data, and based on a successful verification check, output a confirmation signal.

* * * * *